3,345,328
POLY-α-OLEFIN COMPOSITIONS CONTAINING DIALKYL - 3,3' - THIODIPROPIONATES AND THIOBISPHENOLS

Clarence E. Tholstrup, Kingsport, Tenn., assignor to Eastman Kodak Company, Rochester, N.Y., a corporation of New Jersey
No Drawing. Filed Dec. 21, 1959, Ser. No. 860,667
28 Claims. (Cl. 260—45.85)

This invention relates to new poly-α-olefin compositions. Preferred embodiments of the invention relate to polyethylene and polypropylene compositions having improved stability at elevated temperatures to oxidative degradation.

Poly-α-olefins such as polyethylene, polypropylene and the like are commonly subjected to elevated temperatures in the course of their processing into useful items of commerce. Such processing methods as rolling, injection molding, extrusion and the like at elevated temperatures usually result in oxidative degradation of the polymer. In addition, many uses of poly-α-olefins, such as in electrical insulation and the like, oftentimes expose the poly-α-olefin to elevated temperatures. To minimize oxidative deterioration in poly-α-olefins, anti-oxidants or stabilizers are oftentimes incorporated therein.

It is an object of this invention to provide new poly-α-olefin compositions having improved resistance to thermal degradation.

It is another object of this invention to provide new synergistic combinations of stabilizers for poly-α-olefin compositions.

It is also an object of this invention to provide novel polyethylene and polypropylene compositions containing synergistic combinations of compounds that improve the stability of the polyethylene and polypropylene compositions against deterioration resulting from exposure to elevated temperatures.

Other objects of the invention will be apparent from the description and claims that follow.

The present invention comprises poly-α-olefin compositions having incorporated therein a stabilizer combination of a diester of 3,3'-thiodipropionic acid and a thiobisphenol.

The diesters of 3,3'-thiodipropionic acid comprising the present stabilizer combination have the following formula

wherein R is an alkyl radical having at least 4 and generally 4 to 20 carbon atoms, with 8 to 18 carbon atoms being preferred. A particularly effective ester has twelve carbon atoms for the R substituent, namely, dilauryl-3,3'-thiodipropionate. However, any diester of 3,3'-thiodipropionic acid as described above can be employed in the present stabilizer combination including the butyl, amyl, hexyl, heptyl, octyl, nonyl, decyl, tridecyl, myristyl, pentadecyl, cetyl, heptadecyl, stearyl, and eicosyl diesters of 3,3'-thiodipropionic acid, or mixtures thereof.

A wide variety of thiobisphenols can be effectively utilized in combination with the described diesters of 3,3'-thiodipropionic acid including those having the following general formulas:

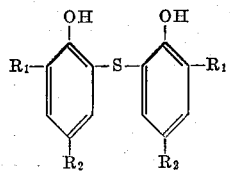

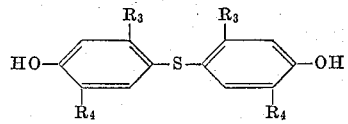

and

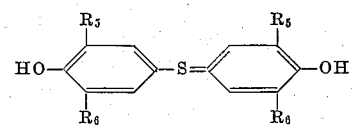

In the above thiobisphenol formulas: $R_1$, $R_2$, $R_3$, $R_4$, $R_5$ and $R_6$ can be hydrogen atoms, alkyl radicals, or cyclic hydrocarbon radicals, and wherein at least one of such radicals or substituents on each phenol nucleus is other than a hydrogen atom. The alkyl radicals desirably have 1 to 18 carbon atoms, and preferably 1 to 12 carbon atoms. $R_1$, $R_4$ and $R_5$ are preferably tertiary alkyl radicals having 4 to 8 carbon atoms such as tertiary butyl radicals and tertiary octyl radicals, or 1-methylcyclohexyl radicals. The cyclic hydrocarbon radicals desirably have 6-carbon cyclic nuclei such as cyclohexyl and benzyl, and preferably are such radicals as 1-methylcyclohexyl and 1-methylbenzyl. Especially useful thiobisphenols in the invention are 2,2'-thiobis(4-methyl-6-tert.-butylphenol), 4,4'-thiobis(3-methyl - 6 - tert.-butylphenol), 4,4'-thiobis[3-methyl-6(1-methylcyclohexyl)phenol] and 4,4'-thiobis(2-methyl-6-tert.-butylphenol). Other typical thiobisphenols of the invention include:

2,2'-thiobis(4,6-dimethylphenol),
2,2'-thiobis(4,6-di-tert.-butylphenol),
2,2'-thiobis(4-ethyl-6-tert.-butylphenol),
2,2'-thiobis(4-n-propyl-6-amylphenol),
2,2'-thiobis(4-methyl-6-n-octylphenol),
2,2'-thiobis(4-amyl-6-tert.-octylphenol),
2,2'-thiobis(4-methyl-6-n-decylphenol),
2,2'-thiobis(4-methyl-6-laurylphenol),
2,2'-thiobis[4-methyl-6-(1-methylcyclohexyl)phenol],
2,2'-thiobis[4-methyl-6-(1-methylbenzyl)phenol],
2,2'-thiobis(4-methylphenol),
2,2'-thiobis(6-tert.-butylphenol),
2,2'-thiobis(4,6-dilaurylphenol),
2,2'-thiobis(4,6-distearylphenol),
4,4'-thiobis(3,6-dimethylphenol),
4,4'-thiobis(3,6-di-tert.-butylphenol),
4,4'-thiobis(3-ethyl-6-tert.-butylphenol),
4,4'-thiobis(3-n-propyl-6-amylphenol),
4,4'-thiobis(3-methyl-6-n-octylphenol),
4,4'-thiobis(3-amyl-6-tert.-octylphenol),
4,4'-thiobis(3-methyl-6-n-decylphenol),
4,4'-thiobis(3-methyl-6-laurylphenol),
4,4'-thiobis(3,6-dilaurylphenol),
4,4'-thiobis(3,6-distearylphenol),
4,4'-thiobis[3-methyl-6-(1-methylcyclohexyl)phenol],
4,4'-thiobis[3-methyl-6-(1-methylbenzyl)phenol],
4,4'-thiobis(2-tert.-butylphenol),
4,4'-thiobis[2-methyl-6-(1-methylcyclohexyl)phenol],
4,4'-thiobis[2-methyl-6-(1-methylbenzyl)phenol],
4,4'-thiobis(2-methyl-6-tert.-butylphenol),
4,4'-thiobis(2-tert.-butylphenol),
4,4'-thiobis(2-methyl-6-laurylphenol),
4,4'-thiobis(2,6-distearylphenol),
and related thiobisphenols.

The combination of the described diesters of 3,3'-thiodipropionic acid and the thiobisphenols can be used to stabilize a wide variety of solid poly-α-olefin compositions against deterioration resulting from exposure to elevated temperatures. Any of the normally solid polymers of α-monoolefinic aliphatic hydrocarbons containing 2 to 10 carbon atoms can be stabilized in accordance with the invention. The subject stabilizer combinations are preferably used in polyethylene and polypropylene, especially polypropylene, although such poly-α-olefins as poly(3-methylbutene-1), poly(4-methylpentene-1), poly(pentene - 1), poly(3,3-dimethylbutene-1), poly(4,4-dimethylbutene-1), poly(octene-1), poly(decene-1) and the like can also be stabilized with the subject stabilizer combinations. Both the so-called "low density" and "high densite" or high crystallinity poly-α-olefin compositions can be stabilized in accordance with the invention. Reference is made to Fawcett et al. U.S. Patent No. 2,153,553 granted Apr. 11, 1939, and to copending applications Coover U.S. Ser. No. 559,536 filed Jan. 17, 1956 and Coover et al. U.S. Ser. No. 724,904 filed Mar. 31, 1958, both of which are now abandoned with regard to the preparation of various poly-α-olefin compositions that can be stabilized against thermal degradation in accordance with the invention. The additive stabilizer combinations of the invention are especially useful for stabilizing the solid resinous poly-α-olefins having average molecular weights of at least 15,000 and more usually at least 20,000, although the stabilizer combinations of the invention can also be utilized to stabilize the so-called poly-α-olefin waxes having lower average molecular weights of usually 3,000 to 12,000.

The amount of the combination of the diester of 3,3'-thiodipropionic acid and the thiobisphenol employed in poly-α-olefin compositions in accordance with the invention can be widely varied, the stabilizing amount of this combination usually varying with the particular use to which the poly-α-olefin compositions are to be put. Concentrations of at least about .001% of each stabilizer component are suitable, although about .001% to 5% for each component are generally used, with about .01% to 3% of the diester of 3,3'-thiodipropionic acid and about .01% to 1% of the thiobisphenol being preferred, the concentration being based on the weight of the poly-α-olefin. We generally utilize the combination of the subject stabilizers at a weight ratio of the diester of 3,3'-thiodipropionic acid to the thiobisphenol in the range of 1/100 to 100/1 and preferably 1/50 to 50/1.

The stabilizer combinations of the invention can be incorporated or blended into poly-α-olefin compositions by the conventional methods utilized for blending such materials into resins or plastics. Typical of such methods that can be suitably employed include milling on heated rolls, deposition from solvents, and dry blending. The stabilizers of the invention can be incorporated separately or together into the poly-α-olefin compositions.

The stabilizer combinations of the present invention lend to poly-α-olefin compositions improved stability, and more particularly, improved stability against oxidative deterioration resulting from exposure to elevated temperatures. In addition, poly-α-olefin compositions containing the stabilizer combinations of the invention have enhanced stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses. Poly-α-olefins stabilized as described can be cast, extruded, rolled or molded into sheets, rods, tubes, pipes, filaments and other shaped articles, including the widely used films of the polymers about .5 to 100 mils in thickness. The present compositions can be used for coating paper, wire, metal foil, glass fiber fabrics, synthetic and natural textiles or fabrics, and other such materials.

The subject stabilizer combinations of dialkyl esters of 3,3'-thiodipropionic acid and thiobisphenol are synergistic combinations, namely, the stabilizing effect of such combinations in poly-α-olefins is substantially greater than the additive effect of the individual stabilizers of the combination.

A small portion of unesterified 3,3'-thiodipropionic acid can be added to the present compositions if desired to minimize discoloration caused by certain phenolic additives. Usually .005% to 3%, and preferably .01% to 1%, based on the weight of the poly-α-olefin of 3,3'-thiodipropionic acid is utilized.

The invention is illustrated by the following examples of preferred embodiments thereof. In the following examples the stability of the poly-α-olefins was determined by an oven storage test. The poly-α-olefin under investigation is compression molded into a smooth sheet or plate. The plate is then cut into pieces weighing about 0.25 g. each. The 0.25 g. samples of the molded polymer are then placed in an air oven at 160° C. Samples are removed at intervals and each sample analyzed for peroxides. The oven storage life is the time required for initial peroxide formation in a sample of the polymer. To determine peroxide formation in the oven exposed samples, each 0.25 g. sample in question is dissolved or suspended in 20 ml. of carbon tetrachloride and allowed to digest for 25 minutes. To this is added 20 ml. of a mixture consisting of 60% glacial acetic acid and 40% chloroform, and then 1.0 ml. of a saturated aqueous solution of potassium iodide. The resulting mixture is allowed to react for two minutes, 100 ml. of water is added to dilute the mixture, and then a starch indicator is added. The resulting mixture is then back-titrated with 0.002 N sodium thiosulfate. The peroxide concentration, P, in milliequivalents per kilogram of polymer is given by the expression, $P=8S$, where S is the number of milliliters of 0.002 N sodium thiosulfate used.

EXAMPLE 1

Several samples of powdered polypropylene were mixed with dialkyl-3,3'-thiodipropionates and a thiobisphenol of the invention, compression molded into plates 1/16 inch in thickness, and the resulting molded samples evaluated with respect to stability by the 160° C. oven storage test described above. The polypropylene was a plastic grade solid polypropylene having an average molecular weight greater than 15,000, a density of about .91 and an inherent viscosity of about 1.46 as determined in Tetralin at 145° C. The results of the stability evaluations are summarized by the data set out in Table A below. Samples of the individual components of the various stabilizer combinations in the polypropylene, as well as the polypropylene with no additive were included in the stability tests for comparative purposes. The concentrations of additive in Table A are based on the weight of the polypropylene. In Table A: "DBTDP" is di-n-butyl-3,3'-thiodipropionate; "DOTDP" is di-n-octyl-3,3'-thiodipropionate; "DDTDP" is di-n-decyl-3,3'-thiodipropionate; "DLTDP" is dilauryl-3,3'-thiodipropionate and "DSTDP" is distearyl-3,3'-thiodipropionate.

Table A

| Additive: | Oven life at 160°C., hours |
|---|---|
| None | 2 |
| 0.3% DBTDP | 3 |
| 0.3% DOTDP | 3 |
| 0.3% DDTDP | 3 |
| 0.3% DLTDP | 3 |
| 0.3% DSTDP | 3 |
| 0.05% 4,4'-thiobis(3-methyl-6-tert.-butylphenol) | 12 |
| 0.05% 4,4'-thiobis(3-methyl-6-tert.-butylphenol)+0.3% DBTDP | 17 |
| 0.05% 4,4'-thiobis(3-methyl-6-tert.-butylphenol)+0.3% DOTDP | 24 |
| 0.05% 4,4'-thiobis(3-methyl-6-tert.-butylphenol)+0.3% DDTDP | 65 |
| 0.05% 4,4'-thiobis(3-methyl-6-tert.-butylphenol)+0.3% DLTDP | >100 |
| 0.05% 4,4'-thiobis(3-methyl-6-tert.-butylphenol)+0.3% DSTDP | >100 |

As can be observed from the data set out in Table A, combinations of dialkyl-3,3'-thiodipropionates and 4,4'-thiobis(3-methyl-6-tert.-butylphenol) are synergistic combinations, the stabilizing effect of such combinations being substantially more than the additive stabilizing effect of the components of such combinations. Similar synergism is demonstrated if 2,2'-thiobis(4-methyl-6-tert.-butylphenol) is substituted for the 4,4'-thiobis(3-methyl-6-tert.-butylphenol), or if solid plastic grade polyethylene having an average molecular weight greater than 15,000, a density of about .91 and a melt index of about 7.59 is substituted for the polypropylene.

EXAMPLE 2

Dilauryl-3,3'-thiodipropionate and 4,4'-thiobis(3-methyl-6-tert.-butylphenol) in combination were evaluated by the method described in Example 1 in the stabilization of plastic grade solid polyethylene having an average molecular weight greater than 15,000, a density of about .91 and a melt index of about 7.59. The results of the stability test are summarized by the data set out in Table B below. The concentrations of additive in Table B are based on the weight of the polyethylene. In Table B, "DLTDP" is dilauryl-3,3'-thiodipropionate.

Table B

| Additive: | Oven life at 160° C., hours |
|---|---|
| None | 2 |
| 0.05% DLTDP | 7 |
| 0.05% 4,4'-thiobis(3-methyl-6-tert.-butylphenol) | 30 |
| 0.05% 4,4'-thiobis(3-methyl-6-tert.-butylphenol) +0.05% DLTDP | >50 |

A similar stabilizing effect as that demonstrated by the data set out in Table B is also demonstrated if 2,2'-thiobis,4-methyl-6-tert.-butylphenol) is substituted for the 4,4'-thiobis(3-methyl-6-tert.-butylphenol).

EXAMPLE 3

Stabilizer combinations of the invention were evaluated by the method described in Example 1 in the polypropylene described in Example 1. For purposes of comparison samples wherein dilauryl-3,3'-thiodipivalate was substituted for a dialkyl-3,3'-thiodipropionate were included in the stability tests. The results of the stability tests are summarized by the data set out in Table C below. In Table C, "DLTDP" is dilauryl-3,3'-thiodipropionate and "DLTDPV" is dilauryl-3,3'-thiodipivalate.

Table C

| Additive: | Oven life at 160° C., hours |
|---|---|
| None | 2 |
| 0.3% DLTDP | 3 |
| 0.3% DLTDPV | 3 |
| 0.1% 2,2'-thiobis(4-methyl-6-tert.-butylphenol) | 15 |
| 0.1% 2,2'-thiobis(4-methyl-6-tert.-butylphenol) +0.3% DLTDP | 30 |
| 0.1% 4,4'-thiobis(3-methyl-6-tert.-butylphenol) | 25 |
| 0.1% 4,4'-thiobis(3-methyl-6-tert.-butylphenol) +0.3% DLTDP | 65 |
| 0.1% 4,4'-thiobis(3-methyl-6-tert.-butylphenol) +0.3% DLTDPV | 25 |
| 0.2% 4,4'-thiobis(3-methyl-6-tert.-butylphenol) | 40 |
| 0.2% 4,4'-thiobis(3-methyl-6-tert.-butylphenol) +0.3% DLTDP | 200 |

The data in Table C further illustrates the synergism that exists between certain thiobisphenols and dialkyl-3,3'-thiodipropionates. In addition, the data in Table C points up the unexpected nature of the present synergistic combinations as illustrated by the fact that dilauryl-3,3'-thiodipivalate, while being closely related to the dilauryl-3,3'-thiodipropionate, of the invention, does not synergize with the thiobisphenol. The concentrations in Table C are based on the weight of the polypropylene.

EXAMPLE 4

Additional stabilizer combinations of the invention were evaluated by the method described in Example 1 in solid plastic grade polypropylene having an average molecular weight greater than 15,000, a density of about .91, and an inherent viscosity of about 1 as determined in tetralin at 145° C. The results of the stability tests are summarized by the data set out in Table D below. In Table D, "DLTDP" is dilauryl-3,3'-thiodipropionate. The concentrations in Table D are based on the weight of the polypropylene.

Table D

| Additive: | Oven life at 160° C., hours |
|---|---|
| None | 0.2 |
| 0.2% DLTDP | 1 |
| 0.1% 4,4'-thiobis(2-methyl-6-tert.-butylphenol) | 20 |
| 0.1% 4,4'-thiobis(2-methyl-6-tert.-butylphenol) +0.2% DLTDP | 130 |
| 0.05% 4,4'-thiobis[3-methyl-6-(1-methylcyclohexyl)phenol] | 18 |
| 0.05% 4,4'-thiobis[3-methyl-6-(1-methylcyclohexyl)phenol] +0.2% DLTDP | 320 |

Similar synergism is also demonstrated if solid plastic grade polyethylene having an average molecular weight greater than 15,000, a density of about .91, and a melt index of about 7.59 is substituted for the polypropylene, or if distearyl-3,3'-thiodipropionate is substituted for the dilauryl-3,3'-thiodipropionate.

The present invention thus provides novel poly-α-olefin compositions having improved stability against deterioration resulting from exposure to elevated temperatures, and particularly, it provides novel synergistic stabilizer combinations for poly-α-olefin compositions.

Although the invention has been described in detail with reference to preferred embodiments thereof, it will be understood that variations and modifications can be effected within the spirit and scope of the invention as described hereinabove and as defined by the appended claims.

I claim:

1. A solid poly-α-olefin composition comprising a solid poly-α-olefin prepared from an α-monoolefinic aliphatic hydrocarbon having 2 to 10 carbon atoms containing a stabilizer combination comprising at least about .001% by weight based on said poly-α-olefin of a diester of 3,3'-thiodipropionic acid having the formula

wherein R is an alkyl radical having 4 to 20 carbon atoms, and at least about .001% by weight based on said poly-α-olefin of a thiobisphenol selected from the group consisting of compounds with the formulas

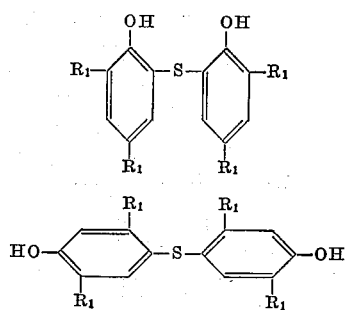

and

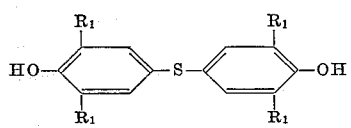

wherein $R_1$ is selected from the group consisting of hydrogen atoms, straight or branched chain unsubstituted alkyl radicals having 1 to 18 carbon atoms and 1-alkylcyclohexyl radicals wherein the alkyl moieties have 1 to 18 carbon atoms, and wherein at least one $R_1$ on each phenol nucleus of said thiobisphenol is other than a hydrogen atom.

2. A solid poly-α-olefin composition comprising a solid poly-α-olefin selected from the group consisting of polyethylene and polypropylene containing a stabilizer combination comprising about .001% to 5% by weight based on said poly-α-olefin of a diester of 3,3'-thiodipropionic acid having the formula

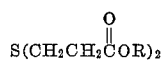

wherein R is an alkyl radical having 4 to 20 carbon atoms, and about .001% to 5% by weight based on said poly-α-olefin of a thiobisphenol selected from the group consisting of compounds with the formulas

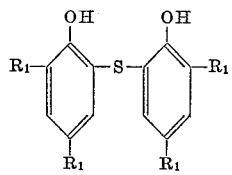

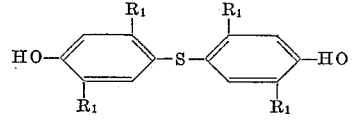

and

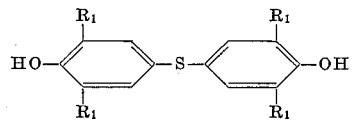

wherein $R_1$ is selected from the group consisting of hydrogen atoms, straight or branched chain unsubstituted alkyl radicals having 1 to 18 carbon atoms and 1-alkylcyclohexyl radicals wherein the alkyl moieties have 1 to 18 carbon atoms, and wherein at least one $R_1$ on each phenol nucleus of said thiobisphenol is other than a hydrogen atom.

3. A solid poly-α-olefin composition comprising solid polyethylene containing a stabilizer combination comprising about .001% to 5% by weight based on said polyethylene of a diester of 3,3'-thiodipropionic acid having the formula

wherein R is an alkyl radical having 4 to 20 carbon atoms, and about .001% to 5% by weight based on said polyethylene of a thiobisphenol selected from the group consisting of compounds having the formulas

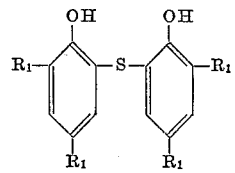

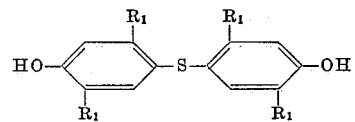

and

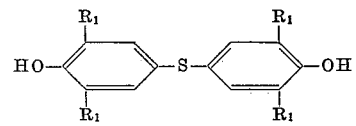

wherein $R_1$ is selected from the group consisting of hydrogen atoms, straight or branched chain unsubstituted alkyl radicals having 1 to 18 carbon atoms and 1-alkylcyclohexyl radicals wherein the alkyl moieties have 1 to 18 carbon atoms, and wherein at least one $R_1$ on each phenol nucleus of said thiobisphenol is other than a hydrogen atom.

4. A solid poly-α-olefin composition comprising solid polypropylene containing a stabilizer combination comprising about .001% to 5% by weight based on said polypropylene of a diester of 3,3'-thiodipropionic acid having the formula

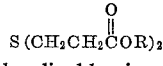

wherein R is an alkyl radical having 4 to 20 carbon atoms, and about .001% to 5% by weight based on said polypropylene of a thiobisphenol selected from the group consisting of compounds having the formulas

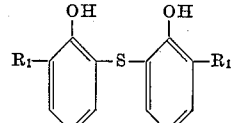

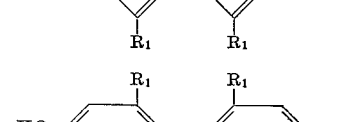

and

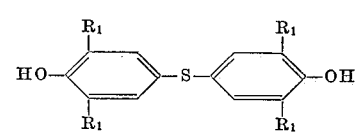

wherein $R_1$ is selected from the group consisting of hydrogen atoms, straight or branched chain unsubstituted alkyl radicals having 1 to 18 carbon atoms and 1-alkylcyclohexyl radicals wherein the alkyl moieties have 1 to 18 carbon atoms, and wherein at least one $R_1$ on each phenol nucleus of said thiobisphenol is other than a hydrogen atom.

5. A solid poly-α-olefin composition comprising solid polyethylene containing a stabilizer combination comprising about .001% to 5% by weight based on said polyethylene of a diester of 3,3'-thiodipropionic acid having the formula

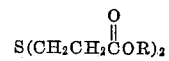

wherein R is an alkyl radical having 8 to 18 carbon atoms, and about .001% to 5% by weight based on said polyethylene of a thiobisphenol having the formula

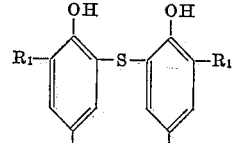

wherein $R_1$ and $R_2$ are straight or branched chain unsubstituted alkyl radicals having 1 to 12 carbon atoms.

6. A solid poly-α-olefin composition comprising solid polyethylene containing a stabilizer combination comprising about .001% to 5% by weight based on said polyethylene of a diester of 3,3'-thiodipropionic acid having the formula

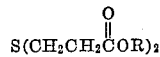

wherein R is an alkyl radical having 8 to 18 carbon atoms, and about .001% to 5% by weight based on said polyethylene of 2,2'-thiobis(4-methyl - 6 - tert.-butylphenol).

7. A solid poly-α-olefin composition comprising solid polyethylene containing a stabilizer combination comprising about .01% to 3% by weight based on said polyethylene of dilauryl-3,3'-thiodipropionate and about .01% to 1% by weight based on said polyethylene of 2,2'-thiobis(4-methyl-6-tert.-butylphenol).

8. A solid poly-α-olefin composition comprising solid polyethylene containing a stabilizer combination comprising about .001% to 5% by weight based on said polyethylene of a diester of 3,3'-thiodipropionic acid having the formula

wherein R is an alkyl radical having 8 to 18 carbon atoms, and about .001% to 5% by weight based on said polyethylene of a thiobisphenol having the formula

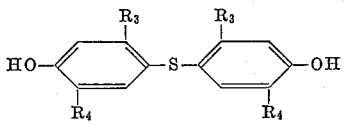

wherein $R_3$ and $R_4$ are alkyl radicals having 1 to 12 carbon atoms.

9. A solid poly-α-olefin composition comprising solid polyethylene containing a stabilizer combination comprising about .001% to 5% by weight based on said polyethylene of a diester of 3,3'-thiodipropionic acid having the formula

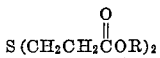

wherein R is an alkyl radical having 8 to 18 carbon atoms, and about .001% to 5% by weight based on said polyethylene of 4,4'-thiobis( 3- methyl - 6 - tert. - butylphenol).

10. A solid poly-α-olefin composition comprising solid polyethylene containing a stabilizer combination comprising about .01% to 3% by weight based on said polyethylene of dilauryl-3,3'-thiodipropionate and about .01% to 1% by weight based on said polyethylene of 4,4'-thiobis(3-methyl-6-tert.-butylphenol).

11. A solid poly-α-olefin composition comprising solid polypropylene containing a stabilizer combination comprising about .001% to 5% by weight based on said polypropylene of a diester of 3,3'-thiodipropionic acid having the formula

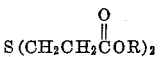

wherein R is an alkyl radical having 8 to 18 carbon atoms, and about .001% to 5% by weight based on said polypropylene of a thiobisphenol having the formula

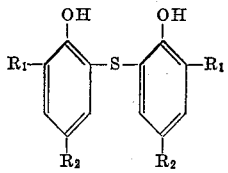

wherein $R_1$ and $R_2$ are straight or branched chain unsubstituted alkyl radicals having 1 to 12 carbon atoms.

12. A solid poly-α-olefin composition comprising solid polypropylene containing a stabilizer combination comprising about .001% to 5% by weight based on said polypropylene of a diester of 3,3'-thiodipropionic acid having the formula

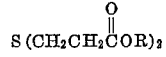

wherein R is an alkyl radical having 8 to 18 carbon atoms, and about .001% to 5% by weight based on said polypropylene of 2,2'-thiobis(4-methyl - 6 - tert. - butylphenol).

13. A solid poly-α-olefin composition comprising solid polypropylene containing a stabilizer combination comprising about .01% to 3% by weight based on said polypropylene of dilauryl-3,3'-thiodipropionate and about .01% to 1% by weight based on said polypropylene of 2,2'-thiobis(4-methyl-6-tert.-butylphenol).

14. A solid poly-α-olefin composition comprising solid polypropylene containing a stabilizer combination comprising about .001% to 5% by weight based on said polypropylene of a diester of 3,3'-thiodipropionic acid having the formula

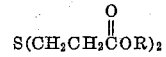

wherein R is an alkyl radical having 8 to 18 carbon atoms, and about .001% to 5% by weight based on said polypropylene of a thiobisphenol having the formula

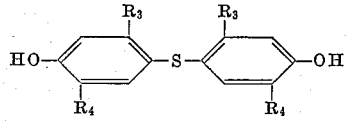

wherein $R_3$ and $R_4$ are alkyl radicals having 1 to 12 carbon atoms.

15. A solid poly-α-olefin composition comprising solid polypropylene containing a stabilizer combination comprising about .001% to 5% by weight based on said polypropylene of a diester of 3,3'-thiodipropionic acid having the formula

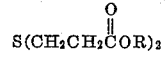

wherein R is an alkyl radical having 8 to 18 carbon atoms, and about .001% to 5% by weight based on said polypropylene of 4,4'-thiobis(3-methyl - 6 - tert. - butylphenol).

16. A solid poly-α-olefin composition comprising solid polypropylene containing a stabilizer combination comprising about .01% to 3% by weight based on said polypropylene of dilauryl-3,3'-thiodipropionate and .01% to 1% by weight based on said polypropylene of 4,4'-thiobis(3-methyl-6-tert.-butylphenol).

17. A solid poly-α-olefin composition comprising solid polyethylene containing a stabilizer combination comprising about .001% to 5% by weight based on said polyethylene of a diester of 3,3'-thiodipropionic acid having the formula

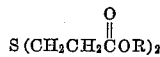

wherein R is an alkyl radical having 8 to 18 carbon atoms, and about .001% to 5% by weight based on said polyethylene of a thiobisphenol having the formula

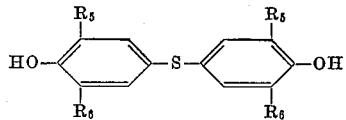

wherein $R_5$ and $R_6$ are alkyl radicals having 1 to 12 carbon atoms.

18. A solid poly-α-olefin composition comprising solid polyethylene containing a stabilizer combination comprising about .001% to 5% by weight based on said polyethylene of a diester of 3,3'-thiodipropionic acid having the formula

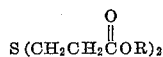

wherein R is an alkyl radical having 8 to 18 carbon atoms, and about .001% to 5% by weight based on said polyethylene of 4,4'-thiobis(2-methyl - 6 - tert. - butylphenol).

19. A solid poly-α-olefin composition comprising solid polyethylene containing a stabilizer combination comprising about .01% to 3% by weight based on said polyethylene of dilauryl-3,3'-thiodipropionate and about .01% to 1% by weight based on said polyethylene of 4,4'-thiobis(2-methyl-6-tert.-butylphenol).

20. A solid poly-α-olefin composition comprising solid polypropylene containing a stabilizer combination comprising about .001% to 5% by weight based on said polypropylene of a diester of 3,3'-thiodipropionic acid having the formula

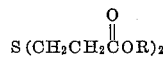

wherein R is an alkyl radical having 8 to 18 carbon atoms, and about .001% to 5% by weight based on said polypropylene of a thiobisphenol having the formula

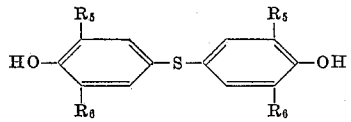

wherein $R_5$ and $R_6$ are alkyl radicals having 1 to 12 carbon atoms.

21. A solid poly-α-olefin composition comprising solid polypropylene containing a stabilizer combination comprising about .001% to 5% by weight based on said polypropylene of a diester of 3,3'-thiodipropionic acid having the formula

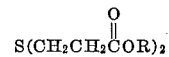

wherein R is an alkyl radical having 8 to 18 carbon atoms, and about .001% to 5% by weight based on said polypropylene of 4,4'-thiobis(2-methyl-6 - tert. - butylphenol).

22. A solid poly-α-olefin composition comprising solid polypropylene containing a stabilizer combination comprising about .01% to 3% by weight based on said polypropylene of dilauryl-3,3'-thiodipropionate and about .01% to 1% by weight based on said polypropylene of 4,4'-thiobis(2-methyl-6-tert.-butylphenol).

23. A solid poly-α-olefin composition comprising solid polypropylene containing a stabilizer combination comprising about .01% to 1% by weight based on said polypropylene of 4,4'-thiobis(3-methyl-6-tert.-butylphenol), and about .01% to 3% by weight based on said polypropylene of di-n-butyl-3,3'-thiodipropionate.

24. A solid poly-α-olefin composition comprising solid polypropylene containing a stabilizer combination comprising about .01% to 1% by weight based on said polypropylene of 4,4'-thiobis(3-methyl-6-tert.-butylphenol), and about .01% to 3% by weight based on said polypropylene of di-n-octyl-3,3'-thiodipropionate.

25. A solid poly-α-olefin composition comprising solid polypropylene containing a stabilizer combination comprising about .01% to 1% by weight based on said polypropylene of 4,4'-thiobis(3-methyl-6-tert.-butylphenol), and about .01% to 3% by weight based on said polypropylene of di-n-decyl-3,3'-thiodipropionate.

26. A solid poly-α-olefin composition comprising solid polypropylene containing a stabilizer combination comprising about .01% to 1% by weight based on said polypropylene of 4,4'-thiobis(3-methyl-6-tert.-butylphenol), and about .01 %to 3% by weight based on said polypropylene of distearyl-3,3'-thiodipropionate.

27. A solid poly-α-olefin composition comprising solid polypropylene containing a stabilizer combination comprising about .01% to 1% by weight based on said polypropylene of 4,4'-thiobis[3 - methyl - 6 - (1 - methylcyclohexyl)phenol], and about .01% to 3% by weight based on said polypropylene of dilauryl-3,3'-thiodipropionate.

28. A stabilized composition comprising a polymer of an alpha monoolefin, having from 2 to 8 carbon atoms, and a stabilizing amount of a stabilizer combination consisting of (1) a diester of 3,3'-thiodipropionic acid having the formula $S(CH_2CH_2COOR)_2$ wherein R is an alkyl radical having from 8 to 20 carbon atoms and (2) a thiobisphenol having the formula

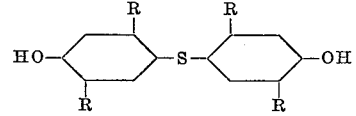

wherein each R is an alkyl radical having from 1 to 18 carbon atoms.

References Cited
UNITED STATES PATENTS

| | | | |
|---|---|---|---|
| 2,519,755 | 8/1950 | Gribbins | 260—45.85 |
| 2,568,902 | 9/1951 | Thompson et al. | 260—45.85 |
| 2,841,619 | 7/1958 | Albert | 260—45.95 |
| 2,841,628 | 7/1958 | Albert | 260—45.95 |
| 2,940,949 | 6/1960 | Mullin | 260—45.95 |
| 2,964,498 | 8/1960 | Taylor | 260—45.95 |
| 2,971,968 | 1/1961 | Nicholson et al. | 260—45.95 |
| 2,972,597 | 1/1961 | Newland et al. | 260—45.95 |
| 2,982,756 | 5/1961 | Mercier et al. | 260—45.95 |

DONALD E. CZAJA, *Primary Examiner.*

LEON J. BERCOVITZ, M. STERMAN, A. SULLIVAN,
*Examiners.*

H. E. TAYLOR, JR., H. LEVINE,
*Assistant Examiners.*